(12) United States Patent
Zieger et al.

(10) Patent No.: US 8,050,985 B2
(45) Date of Patent: Nov. 1, 2011

(54) METHOD AND PROCESS FOR PLANNING REPLENISHMENT OF PRODUCTS IN A DISTRIBUTION SYSTEM

(75) Inventors: Martin Zieger, Karlsruhe (DE); Natasha Oka, Campbell, CA (US); Lihui Zhang, Saratoga, CA (US); Juergen Kuhrs, Nussloch (DE)

(73) Assignee: SAP Aktiengesellschaft, Walldorf (DE)

( * ) Notice: Subject to any disclaimer, the term of this patent is extended or adjusted under 35 U.S.C. 154(b) by 2334 days.

(21) Appl. No.: 10/331,149

(22) Filed: Dec. 27, 2002

(65) Prior Publication Data
US 2004/0128212 A1    Jul. 1, 2004

(51) Int. Cl.
*G06Q 40/00* (2006.01)
(52) U.S. Cl. .......................................... 705/28; 705/35
(58) Field of Classification Search .................. 705/28, 705/35
See application file for complete search history.

(56) References Cited

U.S. PATENT DOCUMENTS

| | | | | |
|---|---|---|---|---|
| 6,006,196 | A * | 12/1999 | Feigin et al. | 705/7.31 |
| 6,925,447 | B2 * | 8/2005 | McMenimen et al. | 705/28 |
| 2002/0010659 | A1 * | 1/2002 | Cruse et al. | 705/28 |
| 2002/0161674 | A1 * | 10/2002 | Scheer | 705/28 |

* cited by examiner

*Primary Examiner* — Muriel Tinkler
(74) *Attorney, Agent, or Firm* — Blakely, Sokoloff, Taylor & Zafman LLP (57) ABSTRACT

Methods and apparatus, including computer program products, for planning replenishment of products in a distribution system. A first key figure associated to a first product and a second key figure associated to a second product are collected, the first product and the second product being distributed by the distribution system. The first key figure and the second key figure are aggregated into an aggregate. The aggregate is used to replenish the first product and the second product.

20 Claims, 4 Drawing Sheets

METHOD AND PROCESS FOR PLANNING
REPLENISHMENT OF PRODUCTS IN A
DISTRIBUTION SYSTEM

BACKGROUND

This application relates to planning replenishment of products in a distribution system.

As products are distributed to retailers and consumers through a distribution system, products are replenished in anticipation of future demands by retailers and consumers. Typically the distribution system monitors consumer and retailer product demand by tracking inventory of individual products and planning to anticipate future inventory issues. By transmitting inventory information from retailers to manufacturers, the number of individual products needed to satisfy projected consumer demand can be determined and products can be sent for replenishing the retailer inventory. By monitoring the demand for each of the individual products, the distribution system can use each product demand to determine the production of each product needed to replenish the retailer inventory.

SUMMARY OF THE INVENTION

In general, in one aspect, the invention is directed to planning replenishment of products in a distribution system. In accordance with this aspect, a first key figure associated to a first product and a second key figure associated to a second product are collected, the first product and the second product being distributed by the distribution system. The first key figure and the second key figure are aggregated into an aggregate. The aggregate is used to replenish the first product and the second product.

In another aspect, the invention is directed to a process for planning replenishment of products in a distribution system. In accordance with this aspect, a collection process collects a first key figure associated with a first product and a second key figure associated with a second product, the first product and the second product being distributed by the distribution system. An aggregation process aggregates the first key figure and the second key figure into an aggregate. A replenishment process uses the aggregate to replenish the first product and the second product.

In another aspect, the invention is directed to an article including a machine-readable medium which stores executable instructions to plan replenishment of products in a distribution system. The instructions cause a machine to collect a first key figure associated with a first product and a second key figure associated with a second product, the first product and the second product being distributed by the distribution system. The instructions also cause the machine to aggregate the first key figure and the second key figure into a product aggregate. The instructions also cause the machine to use the product aggregate to replenish the first product and the second product.

One or more of the following features may be included.

The aggregate may be separated into a first restored key figure and a second restored key figure. The aggregate may be stored. The aggregate may be displayed to a user. Aggregating the first key figure and the second key figure may include converting units of the first key figure. The aggregate may include a number of products to replenish the first product. The aggregate may include a number of products to replenish the first product at a remote location. Separating the aggregate into the first restored key figure and the second restored key figure may include using a percentage associated to the first key figure and the aggregate. Separating the aggregate into the first restored key figure and the second restored key figure may include using a percentage associated to the first key figure and a rounded aggregate. Aggregating the first key figure and the second key figure into an aggregate may include rounding the aggregate. Aggregating the first key figure and the second key figure into an aggregate may include determining a carry over. The first key figure may include a demand key figure. The first key figure may include a production plan key figure.

The planning replenishment system described above can provide one or more of the following advantages.

The system assists in planning the replenishment of products that are distributed within a distribution system. By aggregating individual customer demands associated with each of the products into an aggregate customer demand, product replenishment can be planned based on the aggregate customer demand. Further, monitoring consumption of products is simplified to viewing the aggregate demand that is a single number. Also, by producing an aggregate demand that is a single number, transmitting of multiple individual product demands is reduced to transmitting a single demand for a group of products to the other sites within the distribution system for further processing. Additionally, the transmitted aggregate demand associated to the product group can be separated the into the individual product demands for determining how to satisfy the demands for the individual products. Additional constraints can also be used on the individual demands for the individual products to assist in planning for projected product replenishment. By planning product replenishment with an aggregate of the individual product demands, replenishment planning performance is improved while the complexity of the replenishment planning is reduced.

The details of one or more embodiments are set forth in the accompanying drawings and the description below. Other features and advantages will become apparent from the description, the drawings, and the claims.

DETAILED DESCRIPTION

Figure 1:
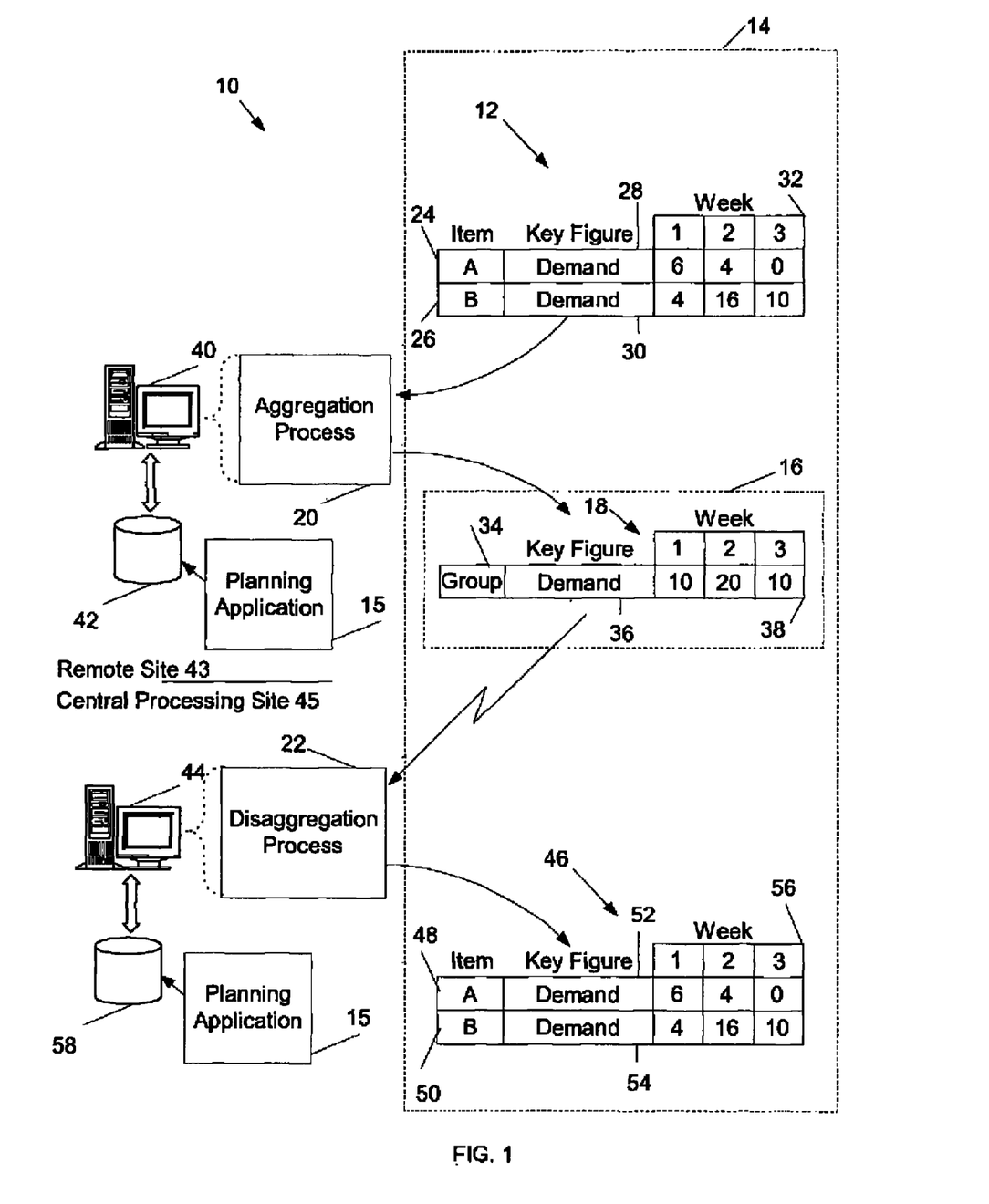
FIG. 1 is a block diagram depicting product replenishment planning in a distribution system.

Product distribution system 10 includes a first computer system 40 and a second computer system 44. Computer system 40 and computer system 44 may be interconnected by a computer network or the like. Communications over the network may be via wired or wireless medium. Each computer in product distribution system 10 may include a respective storage device 42, 58 that stores software, such as operating system software and network software for communicating over the network. Storage devices 42, 58 also store other software, including, but not limited to, a planning application 15 that is executed by each computer system 40, 44 to perform the functions described below.

Planning application 15 contains various software routines for use in supply chain management. Supply chain management refers, generally, to managing commerce (e.g., production planning and deliveries) between a manufacturer, various intermediaries, such as distribution centers, wholesalers, and retailers, and customers. Planning application 15 may include software routines for aggregating and disaggregating quantities associated with products distributed by the product distribution system 10, as described below. Planning application 15 may be executed on either, or both of, computers 40 or 44, using product quantity information that is collected, for example, at retail stores.

Product distribution system 10 includes information 12 associated with individual product items. Information 12 is formatted such that quantities associated with each product item are resolved for accessing, processing, and viewing. To distinguish different formats, the format of individual product information 12 is considered a lower level format 14 of a format hierarchy. By aggregating the individual product information 12, aggregate information 18 associated with product group is produced. Aggregate information 18 has a format that resolves information for a product group and is considered a higher level format 16 in the format hierarchy. Information 12 is collected for use in planning replenishment of product items so that future consumer demand for the items can be projected and met. As explained below, aggregate information 18 relates to individual item information 12 and is used by personnel associated with distribution system 10 to determine consumer consumption. The aggregate information 18 is also used to plan the replenishment of the product items distributed by the distribution system 10. An aggregation process 20, which may be executed on computer system 40, is used to process item information 12 to produce aggregate information 18 that is displayed at the higher level format 16. A disaggregation process 22, which may be executed on computer system 44, provides a method to process the aggregate information 18 back to the lower level format 14 so that when the personnel are planning product replenishment, information associated with individual product items is accessible.

In one embodiment, distribution system 10 distributes product item A 24 and product item B 26 based on consumer demand for the product items and consumption of the distributed product items. Consumer demand for each item is one of many key figures that is used in planning replenishment of the items. So, for example, retail stores may use the consumer demand key figure to ensure that they have the appropriate amount of the items in stock to meet future demand for the product, while not stocking an excessive amount of the items. In some embodiments, other key figures are used in replenishment planning, examples of which are receipts associated with individual product items being distributed, along with stock already present in different locations (e.g., retail stores).

In this embodiment, a demand key figure 28 is associated with item A 24 and another demand key figure 30 is associated with item B 26. The demand key figures for products A 24 and B 26 may be the same or they may be different. In this embodiment, each demand key figure 28, 30, provides anticipated demand of each item in a chart 32 for each week over a three week period. Time periods other than three weeks may, of course, be used. In this embodiment, the demand is anticipatory; meaning that the three week period is in the future; although other types of demand schedules (past, present, etc.) may be used in addition to, or instead of, an anticipatory schedule.

In one example, item A 24 has an anticipated demand of 6 units in week 1, 4 units in week 2, and 0 units in week three. Item B 26 has an anticipated demand of 4 units in week 1, 16 units in week 2, and 10 units in week 3. Thus, demand key figures 28, 30 for each of the two items provide the demand over the three week period. By using this anticipatory demand planning information, personnel associated with the distribution system 10 may plan the number of units needed to replenish item A 24 and item B 26 over the specified three week period.

Aggregation process 20 aggregates demand information in chart 32 associated with each of the two items 24, 26 so that distribution system 10 personnel can view an aggregate demand that is associated with a product group 34 that includes both item A 24 and item B 26. Aggregation process 20 groups item A 24 and item B 26 into the product group 34, thereby allowing the personnel to view demands 28, 30 as a single group demand key figure 36 for the items. By viewing the group demand, and other associated aggregated key figures with a high level format 16, distribution system 10 personnel can quickly access the amount of items of the product group 34 that are needed for product replenishing over a period of time (e.g., each week for the three week period). In this example, a chart 38 provides the aggregate demand information to correspond with each week of the three week period as shown in chart 32, although other presentations may be used.

Computer system 40 executes aggregation process 20 to collect and store, in storage device 42, individual item information 12 associated with item A 24 and item B 26 that have a lower level format 14 and aggregate information 18 associated with product group 34 that has a higher level format 16. Computer system 40 also displays, to distribution system 10 personnel, individual item information 12 (e.g., item demand over the three week period) and aggregate information 18 (e.g., product group demand over the three week period).

Aggregation process 20 aggregates individual item information 12 to produce aggregate information 18 that has a higher level format 16. In this embodiment, aggregate information 18 includes product group 34. Product group 34 includes both item A 24 and item B 26. Group demand key figure 36 is an aggregate of the respective demands in chart 32 associated with item A and item B. For example, as shown in chart 38, product group demand 36 for week 1 (i.e., 10 units) is the aggregate of the respective demand for item A 24 for week 1 (i.e., 6 units) and demand for item B 26 for week 1 (i.e., 4 units) that are shown in chart 32. Similarly, product group demand 36 for week 2 and week 3 are aggregates of respective demands associated with item A 24 and item B 26 for week 2 and week 3. In particular, the 4 unit demand of item A 24, for week 2 as shown in chart 32, is aggregated with the 16 unit demand of item B 26 also for week 2, to provide a product group demand 36 of 20 units for week 2 as shown in chart 38. This aggregate information 18 is displayed on the computer system 40, thereby informing a viewer of information with a higher level format 16. The computer system 40 also stores this aggregate information 18 on the storage device 42.

After aggregating the individual item information 12, computer system 40 transmits the aggregate information 18 to computer system 44, which may execute disaggregation process 22 to disaggregate aggregate information 18. In some embodiments, computer system 44 is located at a central processing site of the distribution system 10 (e.g., a manufacture warehouse) that is remote from computer system 40. Computer system 40 may be located at a site where the individual item information 12 is collected (e.g., a retail store). One of the advantages of computer system 40 transmitting aggregate information 18 is that computer system 44 (at the central processing site) can receive and easily track information from numerous computer systems (e.g., computer system 40 and other computers) located in the distribution system 10. Thus, personnel in distribution system 10 can quickly plan the product replenishing for each of the remote locations. However, in some arrangements, distribution system 10 personnel often need to view how aggregate information 18 is distributed across the individual items included in product group 34. To determine this distribution, computer system 44 executes disaggregation process 22.

Disaggregation process 22 receives aggregate information 18 and separates the aggregate information to restore individual item information 46 to the lower level format 14. In this example, disaggregation process 22 receives aggregate information 18 and restores the information associated with a restored item A 48 and a restored item B 50. Disaggregation process 22 also separates the key figures associated with each product item across a particular time period (e.g., three weeks). In this example, disaggregation process 22 provides a restored demand key figure 52 for restored item A 48 and a restored demand key figure 54 for restored item B 50, along with corresponding demand information for each week of the three week period (as shown in chart 56) that has a lower level format 14.

To determine the distribution from the aggregate demands over each week of the three week period shown in chart 56, disaggregation process 22 uses the percentage of each demand associated with each item in comparison to the aggregate demand of both items. For example, in week 1 item A 24 has a demand of 6 units while item B 26 has a demand of 4 units. Thus the aggregate of both items for week 1 is 10 units, as was shown in chart 38. Of the 10 units in the demand aggregate for week 1, 60% of the units (i.e., 6 units) are associated with item A 24 and 40% of the 10 unit aggregate (i.e., 4 units) are associated with item B 26. Using these two percentages (i.e., 40% and 60%) disaggregation process 22 determines the distribution of product group demand key figure 36 for each restored item (i.e., restored item A 48 and restored item B 50). By determining this distribution of the key figures for each of the restored items from product group 34, personnel at the central site using computer system 44 can study more detail than is supplied from viewing information with the higher level format 16. Correspondingly, in this example, disaggregation process 22 determines the distribution of restore demand key figures 46, 48 for week 2 and week 3 as shown in chart 56. For each of the three weeks, disaggregation process 22 determines the number of units projected as in demand for restored item A 48 and restored item B 50. In this particular example, restored demand key figures 46, 54 for each of the three weeks in chart 56 match each of demand key figures 28, 30 over the same three weeks in chart 32 as received by the aggregation process 20.

In some arrangements, disaggregation process 22 is executed by the computer system 40 that executes aggregation process 20. By executing both disaggregation process 22 and aggregation process 20 on computer system 40, distribution system 10 personnel working at the location of the computer system 40 can view individual item information 12, aggregate information 18, and restored individual item information 46. Thus, if disaggregation process 22 distributes restored individual item information 46 such that it does not match individual item information 12, distribution system personnel can view how restored individual item information 46 will be viewed on computer system 44 located at the central site 45.

Figure 2:
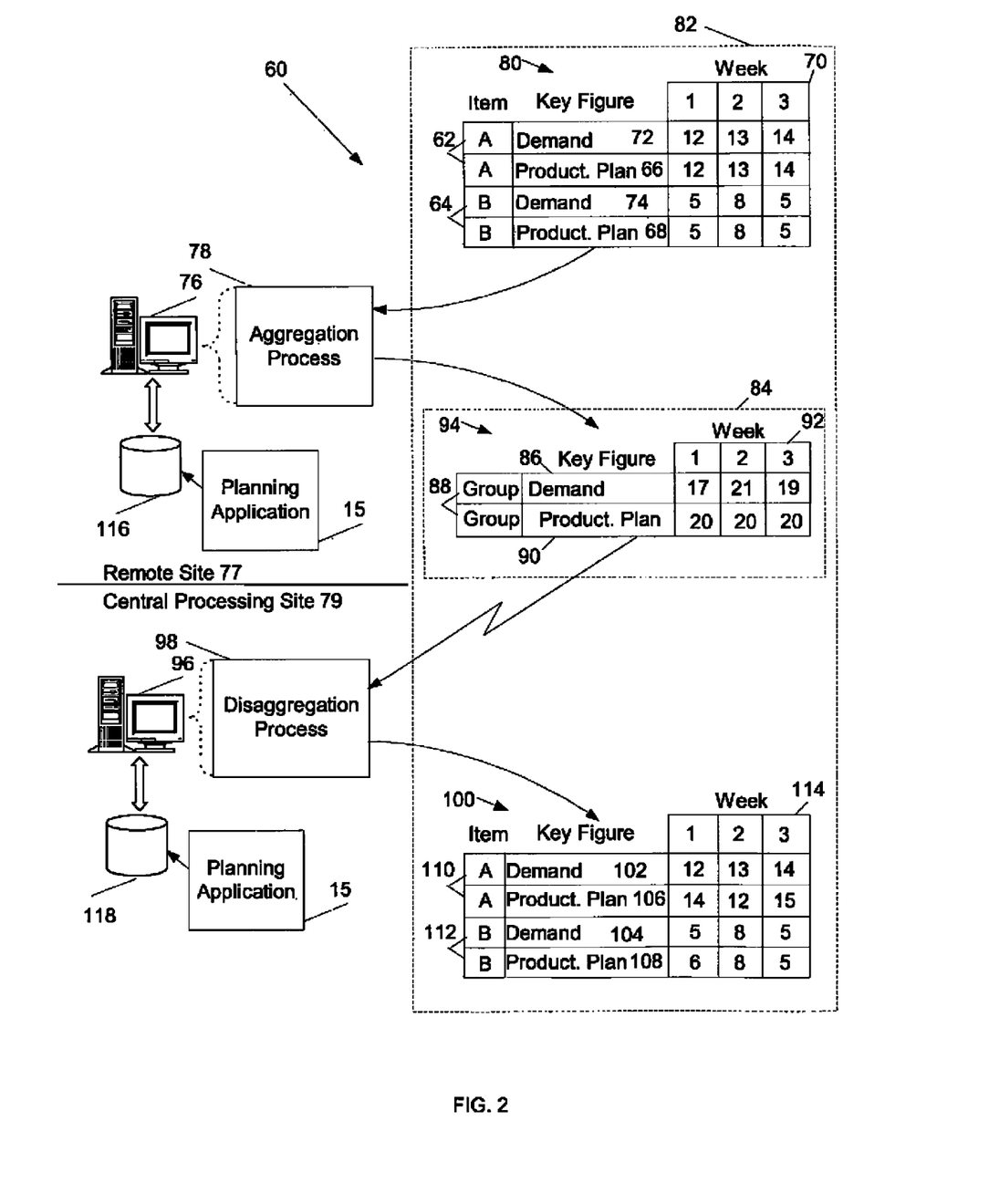
FIG. 2 is a block diagram depicting product replenishment planning in a distribution system.

Referring to FIG. 2, a distribution system 60 is shown that constraints aggregate information such that restored information does not match original individual item information, i.e., items are replenished at a rate that does not exactly follow anticipated consumer demand. Similar to the example show in FIG. 1, distribution system 60 plans replenishment of item A 62 and item B 64 for each week of a three week period. However, in this particular example, distribution system 60 is also tracking a production plan key figure 66, 68 respectively associated with each product item 62, 64. For example, for 1, as shown in chart 70, distribution system 60 is planning on a 12 unit demand for item A 62 and a 5 unit demand for item B 64, as shown by respective demand key figures 72, 74. To satisfy these demands, distribution process 60 plans production to match each of the demands. For item A 62, distribution system 60 plans on producing 12 units and for item B 64 a 5 unit production is planned to match each demand associated with week 1. This matching of demand key figures 72, 74 and production plan key figure 66, 68 for item A 62 and item B 64 continue in week 2 and week 3 of the three week period as shown in chart 70.

Also similar to the distribution system in FIG. 1, computer system 76 executes an aggregation process 78 to aggregate the individual item information 80 that has lower level format 82 into higher level format 84 of a format hierarchy. In this particular example, two respective demand key figures 72, 74 and two respective production plan key figures 66, 68 are aggregated by aggregation process 78. For example, in week 1 item A 62 demand key figure 72 for 12 units is aggregated with item B 64 demand key figure 74 for 5 units to produce an aggregate key figure demand 86 of 17 units for product group 88 with higher level format 84. Aggregation process 78 also rounds up the calculated aggregate production plan key figure 90. In this particular example, item A 62 production plan key figure 66 of 12 units aggregates with item B 64 production plan key figure 68 of 5 units to produce an aggregate production plan key figure 90 of 17. However, aggregate production plan key figure 90 is rounded up to the nearest ten units. Therefore, aggregate production plan key figure 90 of seventeen units is rounds up to 20 units as shown in chart 92. Due to the rounding up to 20 units for aggregate production plan key figure 90, there are 3 extra units planned for production in week 1. The 3 extra units are thus carried over to the next week (i.e., week 2) so that the extra units can be placed against the aggregate demand key figure 86 associated with the next week.

In week 2, aggregation process 78 determines aggregate demand key figure 86 by aggregating demand key figures 72, 74 associated with item A 62 (i.e., 13 units) and item B 64 (i.e., 8 units). This results in an aggregate demand key figure 86 of 21 units for week 2. Similarly aggregate production plan key figure for week 2 is the aggregate of the production plans associated with item A 62 (i.e., 13 units) and item B 64 (i.e., 8 units) for week 2 as shown in chart 70. However in determining aggregate production plan key figure 90, aggregation process 78 uses the extra units carried over from the previous week (i.e., week 1). So in this example, aggregate production plan key figure 90 for week 2 is the aggregate of 21 units reduced by the extra production units from week 1 (i.e., 3 units) which results in an aggregate of 18 units. Similar to week 1, aggregate production plan key figure 90 of week 2 is rounded up to the nearest ten units. Thus aggregate production plan key figure 90 for week 2 rounds up to 20 units. Also the extra units in week 2 are carried over to the next week. In this particular example two extra units are carried over for use in week 3.

In week 3, aggregation process 78 aggregates the demand key figure 72 associated with item A 62 (i.e., 14 units) and the demand key figure 74 associated with item B 64 (i.e., 5) to produce the aggregate demand key number 86 of 19 units. Aggregation process 78 also aggregates the production plan key figure 66 associated with item A 62 (i.e., 14 units) for week 3 and the production plan key figure 68 associated with item B 64 (i.e., 5 units) for week 3. However, similar to week 2, the carry over production plan units reduce the aggregate production plan key figure 90 for week 3 (i.e., 14 units+5 units−2 units=17 units) prior to rounding up to the nearest ten units. In this example, the reduced aggregate is rounded up to 20 units for the aggregate production plan key figure 90 of week 3.

Similar to the distribution process in FIG. 1, computer system 76 displays aggregate information 94 so that distribution process 60 personnel can quickly view aggregate demand key figure 86 and aggregate production plan key figure 90 over the three week as shown in chart 92. Also similar to the distribution process 10 shown in FIG. 1, the aggregate information 94 is transmitted to other locations, such as computer system 96 at the central processing site where aggregate information from numerous sites is collected and analyzed. Once the aggregate information is received by computer system 96, the aggregate information 94 is displayed and processed by using a disaggregation process 98 to produce restored individual item information 100. By producing restored individual item information 100 with lower level format 82, personnel using computer system 96 can view respectively restored demand key figures 102, 104 and restored individual production plan key figures 106, 108 for respectively restored individual item A 110 and item B 112. Also, due to the rounding-up of aggregate production plan key figure 90, restored individual production plan key figures 106, 108 in chart 114 can differ from the individual production plan key figures 66, 68 in chart 70.

Disaggregation process 98, which is similar to disaggregation process 22 shown in FIG. 1, uses the percentage of each respective demand key figure 72, 74 in comparison to aggregate demand key figure 88 to determine restored demand key figures 102, 104. For this example in week 1, restored demand key figure 102 (i.e., 12 units) for item A 110 is 70.6% of aggregate demand key figure 86 of 17 units and restored demand key figure 104 (i.e., 5 units) for restored item B 112 is 29.4% of aggregate demand key figure 86 of 17 units. For weeks 2 and 3, disaggregation process 98 determines the restored demand key figures for restored item A 62 and restored item B 64 using the percentage of the demands for each individual item respective upon the aggregate demand for each respective week. For example, in week 2 the percentage for demand key figures 72 for item A 62 is determined by 13 units/21 units (i.e., 61.9%) and the percentage for demand key figure 74 for item B 64 is determined by 8 units/21 units (i.e., 38.1%). Similarly, in week 3 the percentage for demand key figure 72 for item A 62 is 73.7% (i.e., 14 units/19 units) and the percentage for demand key figure 74 for item B 64 is 26.3% (i.e., 5 units/19 units). From these percentages, disaggregation process 98 determines respective restored individual demand key figures 102, 104 for restored item A 110 and restored item B 112, which for this example match respective demand key figures 72, 74 that are used by the aggregation process 76.

Disaggregation process 98 uses the percentage of each respective production plan key figure 66, 68 in chart 70 with respect to the respective rounded-up aggregate production plan key figure 90 in chart 92 to determine the distribution of restored production plan key figures 106, 108 in chart 114. For example, in week 1 the production plan key figure 66 for item A 62 (i.e., 12 units) and the production plan key figure 68 for item B 64 (i.e., 5 units) aggregate to 17 units. So the percentage based on the aggregate for item A is 70.6% (12 units/17 units) and the percentage based on the aggregate for item B is 29.4% (5 units/17 units). Disaggregation process 98 determines the respective restored production plan key figures 106, 108 by using this these percentages with the respective rounded-up aggregate production plan key figures 90 shown in chart 92. For example, for restored item A 110 in week 1 the restored individual production plan key figure 106 is 70.6% of the rounded-up aggregate production plan key figure 90 for week 1 (i.e., 20 units) which results in 14 units. For restored item B 112 in week 1 the restored individual production plan key number is 29.4% of the rounded-up aggregate production plan key figure 90 for week 1 (i.e., 20 units) which results in 5 units as shown in chart 114. Correspondingly, for week 2 the restored individual production plan key figure 106 for item A 110 (i.e., 12 units) and the restored individual production plan key figure 108 for item B 112 (i.e., 8 units) is determined by disaggregation process 98 using the percentages of the respective production plan key figures 66, 68 (i.e., 13 units for item A and 8 units for item B) for week 2 in respect to the aggregate these two numbers (i.e., 13 units+8 units=21 units) prior to rounding up. For example, in week 2, for item A 62 the percentage is 61.9% (i.e., 13 units/21 units) while for item B 64 the percentage is 38.1% (i.e., 8 units/21 units). Again, using the rounded-up aggregate production plan key figure 90 for week 2 (i.e., 20 units), restored item A 110 has a restored individual production plan key figure 106 for week 2 of 12 units (i.e., 61.9% of 20 units) and restored item B 112 has a restored individual production plan key figure 108 for week 2 of 8 units (i.e., 38.1% of 20 units). Similarly in week 3, restored individual production plan key figure 106 for restored item A 110 is 15 units and restored individual production plan key figure 108 for restored item B 112 is 5 units based on the percentage of each respective item (i.e., 73.7% or 14 units/19 units for item A and 26.3% or 5 units/19 units for item B) with respect to the respective aggregates prior to rounding-up for the aggregate production plan key figure 90. Distribution system 60 also includes respective storage devices 116, 118 that respectively store individual item information 80, aggregate information 94, and restored individual item information 100 similar to distribution system 10 shown in FIG. 1.

Figure 3:
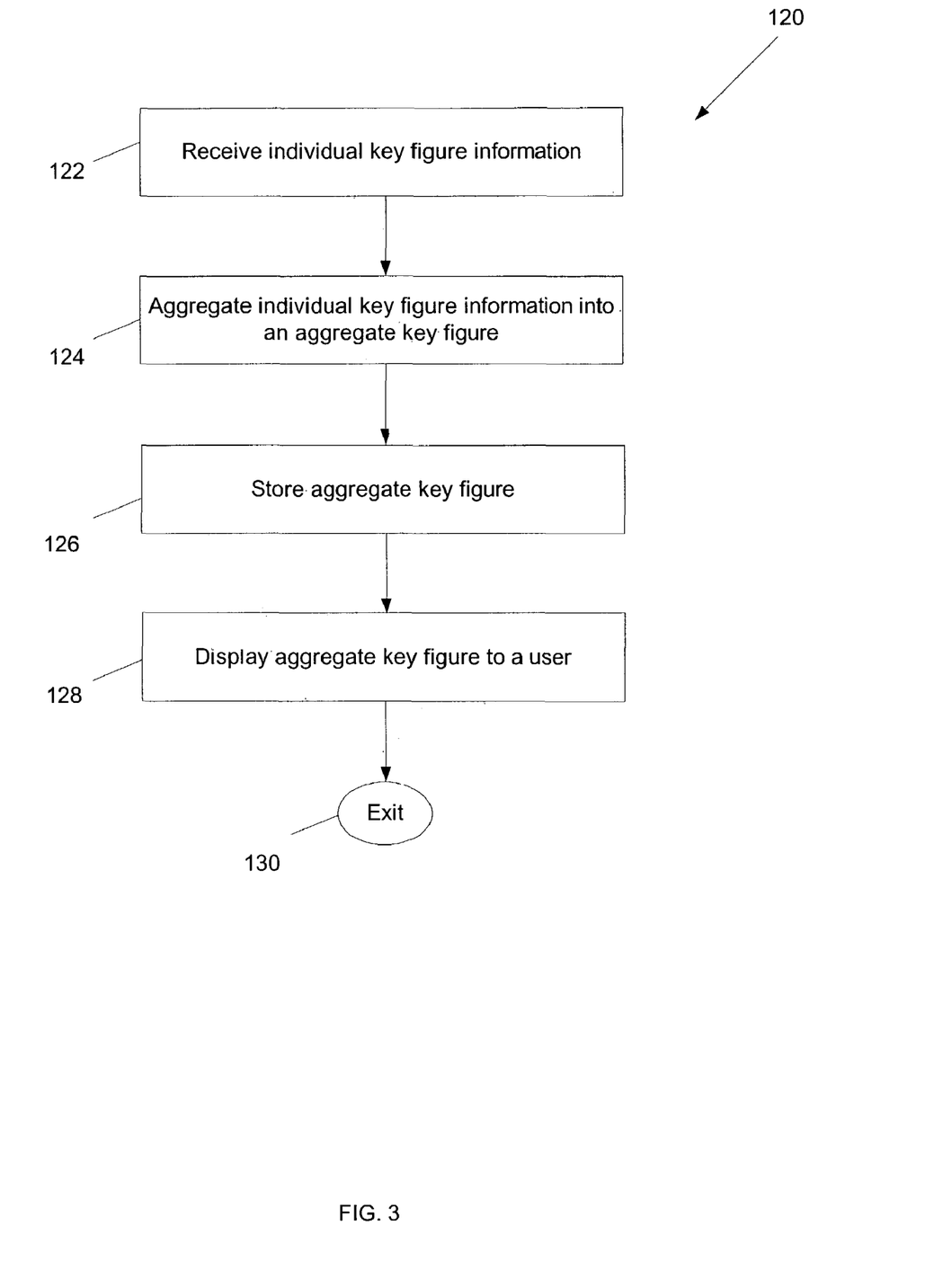
FIG. 3 is a flow chart of a key figure aggregation process.

Referring to FIG. 3, the aggregation process 120 includes receiving (122) individual key figure information. In some embodiments, to receive the individual key figure information, aggregation process 120 retrieves individual key figure information from a storage device (e.g., storage device 42 shown in FIG. 1) associated with a computer system (e.g., computer system 40 also shown in FIG. 1). After receiving (122) the individual key figure information, aggregation process 120 aggregates (124) the individual key figures information to produce an aggregate key figure that has a higher level format 16 (shown in FIG. 1). In some embodiments, prior to aggregating (124) the individual key figure information, some of the key figure information is converted so that all of the key figure information has common measurement units. For example, one particular key figure may have a measurement unit of price in currency (e.g., U.S. dollars) while another particular key figure may have a measurement unit of product units. To aggregate these two key figures, aggregation process 120 converts one of the measurement units to the other measurement unit (e.g., convert unit price in currency to product units) prior to aggregating 124. After aggregating 124 the key figure information into an aggregate key figure, aggregation process 120 stores (126) the aggregate key figure. In some embodiments, the aggregate key figure is stored on the storage device with other aggregated key figure information. Also, in some embodiments, the aggregation process 120 stores (126) the individual key figure information on the storage device separate from the aggregate information and with other individual key figure information. After the aggregate key figure information is stored (126), aggregation process 120 displays (128) the aggregate key figure information to a user so that the aggregate key figure can be monitored and quickly referenced. After the aggregate key figure information is displayed (128) to the user, aggregation process exits 130.

Figure 4:
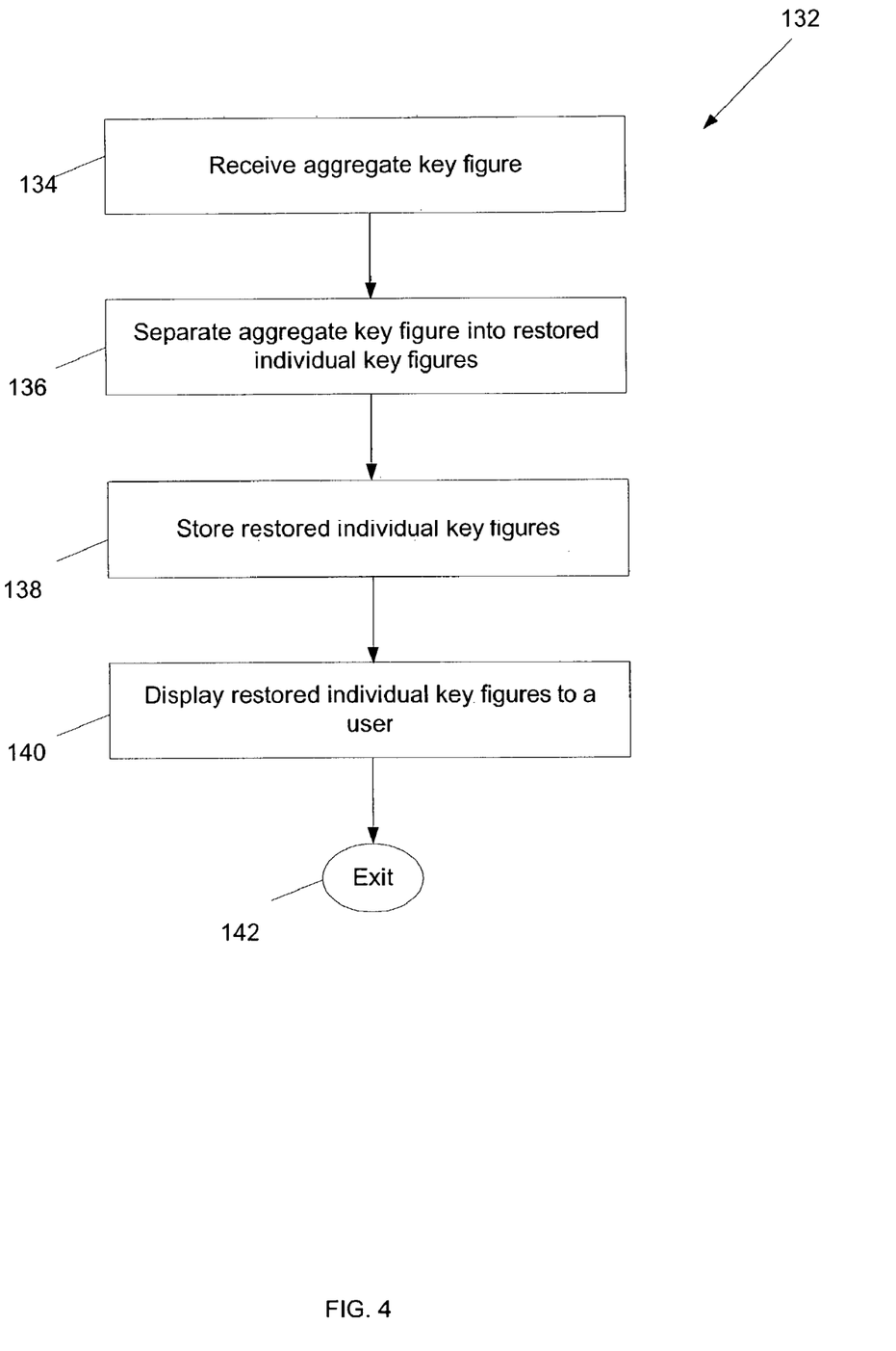
FIG. 4 is a flow chart of a key figure disaggregation process.

Referring to FIG. 4, a disaggregation process 132 is shown. Disaggregation process 132 starts by receiving (134) an aggregate key figure such as the aggregate key figure produced by the aggregation process 120 (shown in FIG. 3). In some embodiments, this aggregate key figure is retrieved from a storage device such as the storage device 42 (shown in FIG. 1). Also, in some embodiments, the aggregate key figure is received from a transmission from a remote site. After the aggregate key figure is received (134), disaggregation process 132 separates (136) the aggregate key figure into restored individual key figures associated with the aggregate key figure. After the aggregated key figure is separated (136) into the restored individual key figures, disaggregation process 132 stores (138) the restored individual key figures and displays (140) the restored individual key figures to the user of disaggregation process 132. By displaying (140) the restored individual key figures to the user, the user can analyze the demands, consumption, and other information in the restored individual key figures. After the restored individual key figures are stored (138) and displayed (1140) to the user, disaggregation process 132 exits (142).

The processes described herein can be implemented in digital electronic circuitry, or in computer hardware, firmware, software, or in combinations of them. The processes described herein can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods can be performed by one or more programmable processors executing a computer program to perform functions of the invention by operating on input data and generating output. The method can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide interaction with a user, the invention can be implemented on a computer having a display device, e.g., a CRT (cathode ray tube), or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The processes described herein can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method for planning replenishment of products in a distribution system, the method comprising:

collecting, for each of a plurality of time periods, a first key figure associated with a first product and a second key figure associated with a second product, the first product and the second product being distributed by the distribution system;

summing the first key figure and the second key figure to obtain an aggregate for each of the time periods;

reducing, in a computer, the aggregate by a carry over value from a previous time period to produce a reduced aggregate, the carry over value being a round-up amount of the aggregate in the previous time period;

rounding up the reduced aggregate to produce a rounded aggregate;

transmitting the rounded aggregate for use in planning replenishment of the first product and the second product; and separating the rounded aggregate into a first restored key figure associated with the first product and a second restored key figure associated with the second product for each time period.

2. The method of claim 1, further comprising: storing the rounded aggregate.

3. The method of claim 1, further comprising: displaying the rounded aggregate to a user.

4. The method of claim 1, wherein the rounded aggregate includes a number of products to replenish the first product.

5. The method of claim 1, wherein the rounded aggregate includes a number of products to replenish the first product at a remote location.

6. The method of claim 1, wherein separating the aggregate into the first restored key figure and the second restored key figure comprises:
   using the rounded aggregate multiplied by a first percentage and a second percentage, respectively, to compute the first restored key figure and the second restored key figure, the first percentage being the first key figure divided by the aggregate and the second percentage being the second key figure divided by the aggregate.

7. The method of claim 1, wherein separating the aggregate into the first restored key figure and the second restored key figure comprises:
   displaying the first key figure, the second key figure, the first restored key figure and the second restored key figure to a user.

8. The method of claim 1, wherein the first key figure includes a production plan key figure.

9. The method of claim 1, further comprising: determining a first product demand key figure and a second product demand key figure for a current time period.

10. The method of claim 9, further comprising:
    aggregating the first product demand key figure and the second product demand key figure to produce an aggregate product demand key figure, which represents a total amount of product demand of the first product and second product; and
    transmitting the aggregate product demand key figure for use in planning replenishment of the first product and the second product.

11. A method for planning replenishment of products in a distribution system, the method comprising:
    collecting, for each of a plurality of time periods, a first key figure associated with a first product and a second key figure associated with a second product, the first product and the second product being distributed by the distribution system;
    summing the first key figure and the second key figure to obtain an aggregate for each of the time periods wherein summing the first key figure and the second key figure includes converting units of the first key figure;
    reducing, in a computer, the aggregate by a carry over value from a previous time period to produce a reduced aggregate, the carry over value being a round-up amount of the aggregate in the previous time period;
    rounding up the reduced aggregate to produce a rounded aggregate; and
    transmitting the rounded aggregate for use in planning replenishment of the first product and the second product.

12. An article comprising a non-transitory machine-readable medium which stores executable instructions to plan replenishment of products in a distribution system, the instructions causing a machine to:
    collect, for each of a plurality of time periods, a first key figure associated with a first product and a second key figure associated with a second product, the first product and the second product being distributed by the distribution system;
    add the first key figure and the second key figure to obtain an aggregate for each of the time periods wherein to aggregate the first key figure and the second key figure into the aggregate includes converting units of the first key figure;
    reduce the aggregate by a carry over value from a previous time period to produce a reduced aggregate, the carry over value being a round-up amount of the aggregate in the previous time period;
    round up the reduced aggregate to produce a rounded aggregate; and
    transmit the rounded aggregate to replenish the first product and the second product.

13. The article of claim 12, further comprising instructions to store the rounded aggregate.

14. The article of claim 12, further comprising instructions to display the rounded aggregate to a user.

15. The article of claim 12, wherein the aggregate includes a number of products to replenish the first product.

16. The article of claim 12, wherein the aggregate includes a number of products to replenish the first product at a remote location.

17. The article of claim 12, wherein the first key figure includes a production plan key figure.

18. An article comprising a non-transitory machine-readable medium which stores executable instructions to plan replenishment of products in a distribution system, the instructions causing a machine to:
    collect, for each of a plurality of time periods, a first key figure associated with a first product and a second key figure associated with a second product, the first product and the second product being distributed by the distribution system;
    add the first key figure and the second key figure to obtain an aggregate for each of the time periods;
    reduce the aggregate by a carry over value from a previous time period to product a reduced aggregate, the carry over value being a round-up amount of the aggregate in the previous time period;
    round up the reduced aggregate to produce a rounded aggregate;
    transmit the rounded aggregate to replenish the first product and the second product; and
    separate the rounded aggregate into a first restored key figure associated with the first product and a second restored key figure associated with the second product for each time period.

19. The article of claim 18, wherein to separate the product aggregate into the first restored key figure and the second restored key figure comprises:
    use the rounded aggregate multiplied by a first percentage and a second percentage, respectively, to compute the first restored key figure and the second restored key figure, the first percentage being the first key figure divided by the aggregate and the second percentage being the second key figure divided by the aggregate.

20. The article of claim 18, wherein to separate the product aggregate into the first restored key figure and the second restored key figure comprises:
    display the first key figure, the second key figure, the first restored key figure and the second restored key figure to a user.

* * * * *